UNITED STATES PATENT OFFICE.

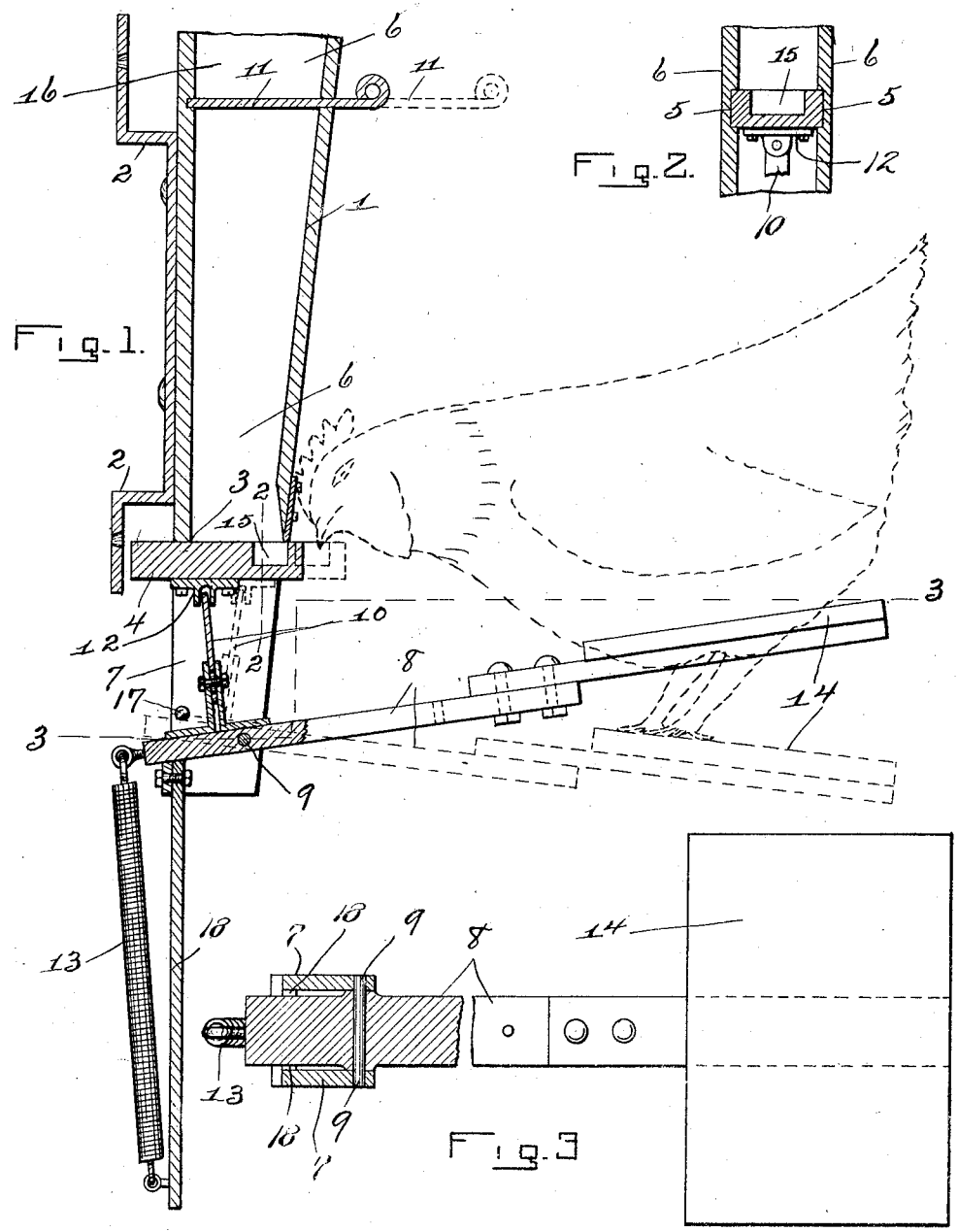

ZOTHIQUE CHOINIERE, OF COHOES, NEW YORK.

POULTRY-FEEDER.

1,344,987. Specification of Letters Patent. Patented June 29, 1920.

Application filed March 26, 1919. Serial No. 285,157.

*To all whom it may concern:*

Be it known that I, ZOTHIQUE CHOINIERE, a citizen of the United States, residing at Cohoes, county of Albany, and State of New York, have invented certain new and useful Improvements in Poultry-Feeders, of which the following is a specification.

Reference may be had to the accompanying drawings, and the reference characters marked thereon, which form a part of this specification. Similar characters refer to similar parts in the several figures herein.

The principal object of the invention is to provide means whereby feed is supplied to poultry in limited quantities by the action of the fowls themselves.

Other objects will appear in connection with the following description.

Figure 1 of the drawings is a central longitudinal section of my improved poultry-feeding device.

Fig. 2 is a vertical cross section of the same taken on the broken line 2—2 in Fig. 1.

Fig. 3 is a horizontal cross section taken on the broken line 3—3 in Fig. 1.

Referring to the drawings wherein the invention is shown in preferred form, 1 is a magazine for containing a supply of feed, which magazine may be mounted or supported in any known manner.

I have shown a bracket, 2, attached to the rear side of the magazine whereby the same may be mounted upon a side-wall of a barn or other building.

The magazine is provided with a bottom opening at 3, which opening is closed by a slide 4, capable of inward and outward movement along a slideway formed by horizontal grooves, 5, in the side-walls, 6, of the magazine.

The side-walls, 6, are extended downward below the bottom opening in the magazine, as shown at 7, in Fig. 1, and between these downward extensions a lever, 8, is pivotally mounted thereupon by means of a pin or trunnions, 9, as shown in Fig. 3.

An arm, 10, is mounted upon the lever, 8, with its upper end adapted to play in a bracket, 12, on the under side of the slide, 4, whereby rocking movement of the lever, 8, is transmitted through the arm, 10, to reciprocate the slide, 4, inwardly and outwardly.

A coil-spring, 13, tends to maintain the outer end of the lever, 8, in elevated position. Said coil-spring is connected at one end with the short arm of the lever, 8, and at its opposite end with a bracket, 18, depending from the magazine. Obviously the spring may be connected and supported in any known manner to cause the desired acting upon the lever, 8.

Upon said outer end of the lever, 8, is fixed a perch, 14, adapted to support a fowl, and the tension of the spring, 13, is such that the weight of a fowl upon the perch, 14, will depress the outer end of the lever, 8, against the force of the spring, 13, and thus through the arm, 10, move the slide, 4, from the position shown by solid lines to that indicated by dotted lines in Fig. 1.

In the upper side of the slide, 4, I provide a feed-receptacle formed by a well, 15, so located that when the slide, 4, is in its innnermost position said receptacle is open to the supply of feed in the magazine 1, and that when the slide is in its outermost position said receptacle is openly exposed outside of the magazine, 1, as indicated by dotted lines in Fig. 1.

The operation of the device is as follows:

A supply of feed having been inserted in the magazine, the receptacle or well, 15, becomes filled with the same. The device being exposed in a poultry yard, the fowls will from time to time mount the perch, 14, thereby depressing the lever, 8, and forcing the slide, 4, outwardly to expose the limited quantity of feed in the well or receptacle, 15, which is thus rendered accessible to the fowl on the perch.

When the limited quantity of feed in the well, 15, has been consumed the perch will lose its attractiveness for the fowl which will leave the perch, permitting the perch to be restored to elevated position by the spring, 13, the slide, 4, being thus forced inwardly, and the well, 15, again being filled from the feed supply in the magazine, 1.

A slide, 11, serves as a cover for the magazine, 1, or it may serve as a valve whereby the magazine, 1, can be refilled from time to time from a superposed magazine, 16, which may be made of any desired capacity.

The feed is thus supplied to the fowls in limited quantities so as not to be wasted and the device being actuated by the fowls themselves requires no attention except to maintain a supply of feed within the magazine, 1.

The downward movement of the perch, 14, is limited by the engagement of the lever, 8, with a stop-pin, 17, on one of the side-wall extensions, 7.

What I claim as new and desire to secure by Letters Patent is—

In a poultry-feeder and in combination, a magazine provided with a bottom opening and with a slideway adjacent thereto; a slide closing said bottom opening movable inwardly and outwardly in said slideway, said slide being provided in its upper side with a feed-receptacle; a perch-carrying lever pivotally mounted below said slide; an operating connection between said lever and said slide whereby the slide is moved inwardly and outwardly by rocking movement of said lever; and a spring for yieldingly holding said lever with the perch in elevated position.

In testimony whereof, I have hereunto set my hand this 14th day of March, 1919.

ZOTHIQUE CHOINIERE.